United States Patent [19]
van der Lely et al.

[11] 3,905,737

[45] Sept. 16, 1975

[54] DEVICES FOR COMPRESSING CROP

[76] Inventors: Cornelis van der Lely, 7, Briischerrain, Zug, Switzerland; Ary van der Lely, 10, Weverskade, Maasland, Netherlands

[22] Filed: Mar. 23, 1972

[21] Appl. No.: 237,374

[30] Foreign Application Priority Data
Mar. 26, 1971 Netherlands .................... 7104077

[52] U.S. Cl. ......... 425/363; 425/DIG. 230; 425/455
[51] Int. Cl. ............................................. B29b 1/03
[58] Field of Search ......... 56/1; 100/DIG. 6, 35, 44, 100/177, 178; 425/141, 363, DIG. 230, 455

[56] References Cited
UNITED STATES PATENTS

| | | | |
|---|---|---|---|
| 1,127,925 | 2/1915 | Schueler | 100/DIG. 6 |
| 1,152,919 | 9/1915 | Schueler | 100/178 |
| 1,803,344 | 5/1931 | Noxon | 100/DIG. 6 |
| 2,716,317 | 8/1955 | McClellan | 56/1 |
| 3,015,199 | 1/1962 | McKeon et al. | 56/1 |
| 3,023,559 | 3/1962 | Richey et al. | 56/1 |
| 3,038,419 | 6/1962 | Klemm et al. | 100/44 |
| 3,158,975 | 12/1964 | Peterson et al. | 56/1 |
| 3,233,393 | 2/1966 | Lundell et al. | 56/1 |
| 3,430,583 | 3/1969 | Pool et al. | 100/177 X |
| 3,430,584 | 3/1969 | Bushmeyer | 56/1 X |

*Primary Examiner*—Russell R. Kinsey
*Attorney, Agent, or Firm*—Mason, Mason & Albright

[57] ABSTRACT

A crop compresser wherein crop is compressed between the intermeshing teeth and grooves of gear-like members with either the bottoms of the grooves or faces of the teeth or both inclined and thus diverging where they mesh relative to each other so that the crop is not only compressed but also the compressed crop is moved outwardly in the direction of divergence provided between each tooth face and cooperating groove bottom when the component of the compressive force acting in the diverging direction overcomes friction on the compressed crop from the tooth face, groove bottom and sides which tends to retain crop therein. Sharp edges may be provided on the teeth to cut the inserted crop. The degree of divergence may be varied or may be in opposite directions from a central high point relative to the member. A plurality of gear-like members may intermesh with a single member and the members may be incorporated in a mobile farm implement which includes a tined pick-up device and a worm or rotating member or both to supply crop to the intermeshing gear-like members. Also, these members may be angularly or axially adjustable, within limits, selectively to increase or decrease the divergence or degree of compression. In a device with a plurality of crop compressors, the crop supplied thereto may be cut by rotary or stationary cutting blades between crop compressing groups.

33 Claims, 27 Drawing Figures

PATENTED SEP 16 1975 3,905,737

SHEET 1

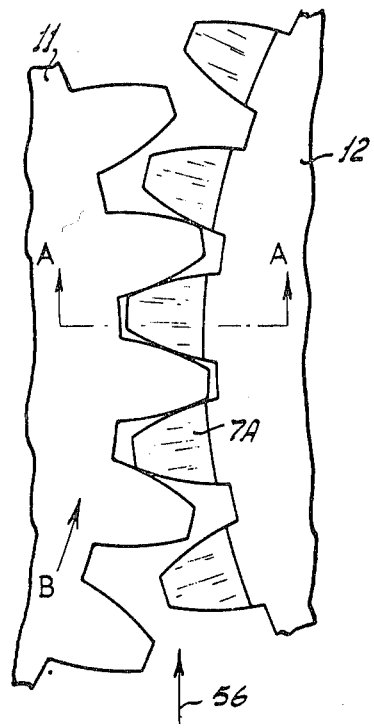
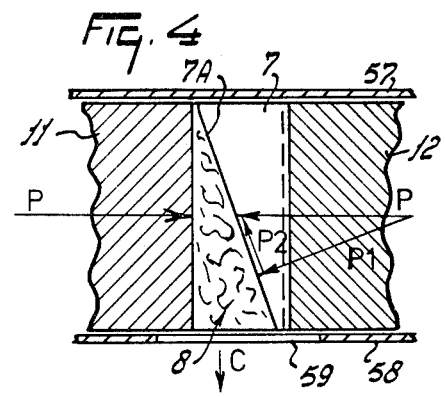
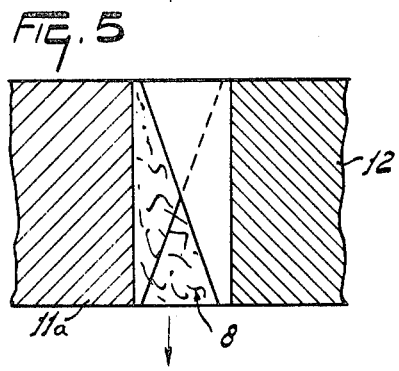
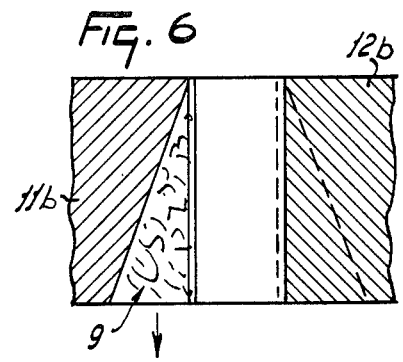
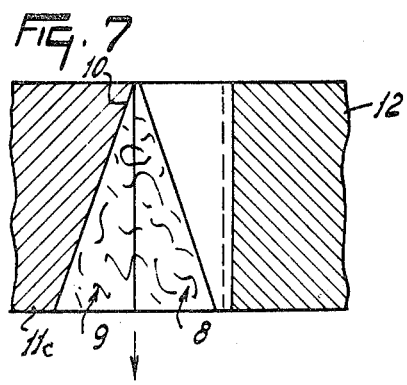
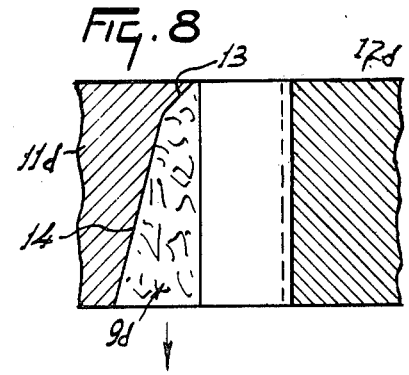

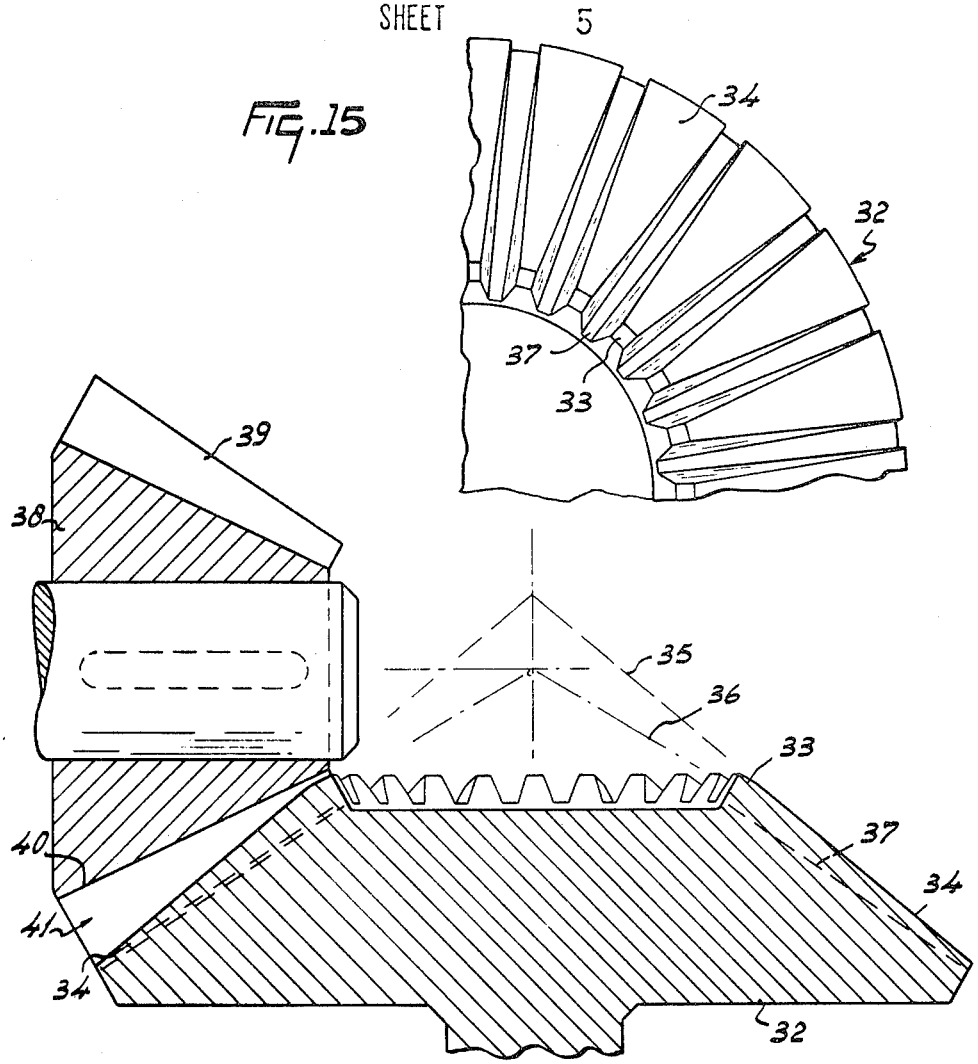
Fig. 15
Fig. 16
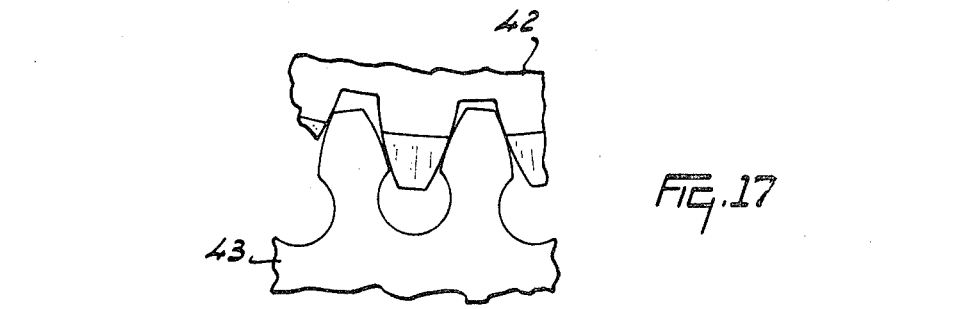
Fig. 17

PATENTED SEP 16 1975 3,905,737

SHEET 8

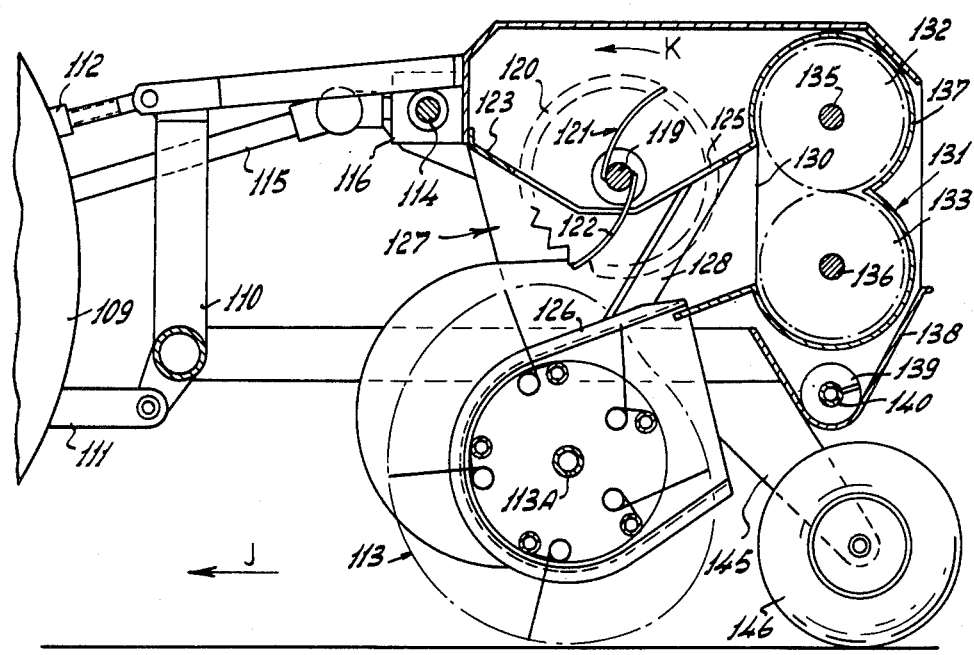

DEVICES FOR COMPRESSING CROP

SUMMARY OF THE INVENTION

The invention relates to a device for compressing crop by means of movably arranged, relatively cooperating members.

According to the invention the device comprises at least one group of at least two members, at least one member being provided with at least one tooth so that near the area of contact between the members at least one space partially bounded by such tooth is available, at least two boundary faces of said space converging or diverging respectively with respect to one another.

According to a second aspect of the invention the device is transportable and comprises a pick-up member for lifting the crop from the field, the crop being fed in a direction transverse of the direction of movement to compression members adapted to rotate about rotary shafts extending approximately in the direction of movement.

According to a third aspect of the invention the crop is fed to a plurality of groups of compression members arranged side by side.

According to a fourth aspect of the invention the crop is inserted into at least one space, which is partially bounded by gear-like teeth with inclined upper surfaces provided on at least one member, the crop being shifted by a resulting pressure in the direction in which teeth extend.

The invention will now be described with reference to the following Figures:

BRIEF DESCRIPTION OF THE FIGURES

FIG. 3 is an elevation of the area of contact between two members viewed in a direction parallel to the rotary shafts of said members;

FIG. 4 is a sectional view taken on the line A—A in FIG. 3, of a first embodiment;

FIG. 5 is a sectional view similar to FIG. 4 but showing a second embodiment;

FIG. 6 is a sectional view similar to FIG. 4 but showing a third embodiment;

FIG. 7 is a sectional view similar to FIG. 4 but showing a fourth embodiment;

FIG. 8 is a sectional view similar to FIG. 4 but showing a fifth embodiment;

FIG. 15 is an elevation parallel to the rotary shaft of part of a bevel gear wheel having chanfered teeth;

FIG. 16 is a sectional view including the rotary shafts of the contact area between a bevel gear wheel and a variant of a bevel gear wheel as shown in FIG. 15;

FIG. 17 is an elevation of the contact area between two toothed members viewed parallel to the rotary shafts, the teeth of one of the members being undercut;

FIG. 20 is a plan view of a kind of toothed rim engaging a plurality of planet-wheel-like members;

FIG. 27 is a sectional view taken on the line XXVII—XXVII in FIG. 26.

DESCRIPTION OF THE PREFERRED EMBODIMENTS

To assist in understanding the invention, certain of the terms will be defined with reference to several of the embodiments.

A set of straight toothed wheels are relatively engaging spur gears having rotary shafts which are parallel to each other. If the generatrices of an individual tooth are parallel to the associated axis of rotation of the gear, straight teeth are involved. If the generatrices are at an angle to the axis of rotation, oblique teeth are involved or, if they are arranged in mirror image fashion to a plane at right angles to the axis of rotation, arrow-shaped teeth are concerned.

Relatively engaging toothed gear wheels fastened to shafts, the axes of which intersect each other are bevel gear wheels. If extensions of the engaged teeth intersect each other at a point lying on the extended center lines of the associated rotary shafts, the bevel gear wheels have a mitre bevel. If the teeth are curved, the bevel gears have a spiral bevel. Where one of the bevel gears is substantially flat, a crown bevel is involved.

Relatively engaging toothed gear wheels fastened to shafts crossing one another are cylindrical gear wheels having inclined teeth or worms and worm wheels. Hypoid gears are also fastened to non-intersecting and nonparallel shafts crossing one another, but they are essentially bevel gear wheels having inclined teeth.

Toothed gear wheels are considered to move as if they contact each other in given imaginary planes so that at the area of the tangent lines no difference in tangential speed is apparent. In the case of spur gear wheels said planes coincide with the surface of circular cylinders. With bevel wheels said planes coincide with the surface of cones having the same apexes.

Figure 1:
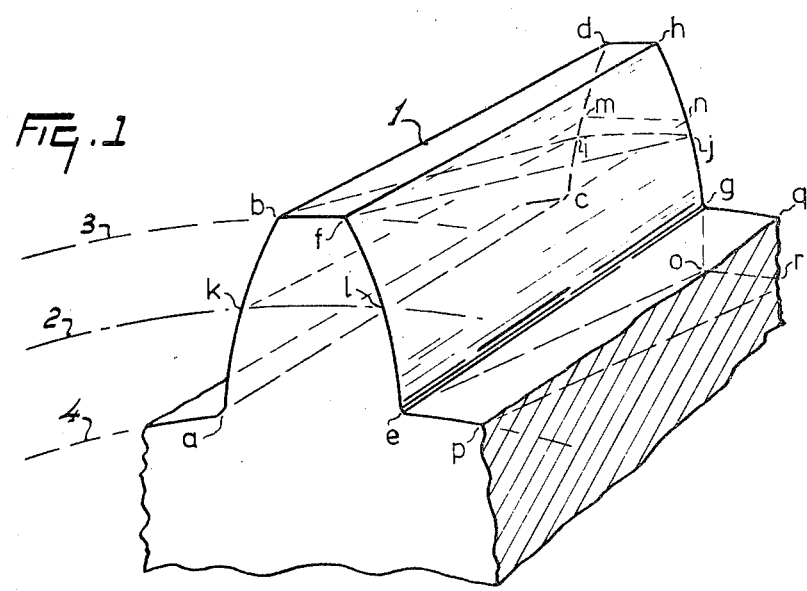
FIG. 1 is a perspective view of part of a member having tooth-shaped extensions.

FIG. 1 shows part of a spur gear type gear wheel having teeth extending directly outwardly therefrom. The portion indicated by $a, b, c, d, e, f, g$ and $h$ forms a tooth 1. The portion $b, f, d, h, k, l, m, n$ is the tooth addendum the portion $k, l, m, n, a, e, c, g$, is the dedendum of the tooth and the points $k, l$ and $m, n$ are located on the pitch circle 2. The circle 3 is circle and the circle 4 is the root circle. That portion of each tooth which extends from the pitch circle outwardly to the addendum circle is the "addendum" and that portion of each tooth that extends from the pitch circle to the root circle is the "dedenum."

The surface $b, f, h, d$ is termed the outer face or surface of the tooth in this specification and in the claims, whereas the surface $e, g, h, f$ is termed the tooth flank or side. However, as indicated hereinafter in the specification, if part of a tooth (for example the portion $b, f, h, d, i, j$) is absent or has been removed, the tooth surface farthest remote from the rotary shaft of the wheel (in this case the surface $b, f, i, j$) is also termed the outer face or surface. This term has the same meaning with bevel wheels, cylindrical wheels, worm wheels and hypoid wheels.

If a portion of a tooth, for example the portion $d, f, h, d, i, j$ is absent, the remaining portion ($b, f, i, j, c, g, a, e$) is termed an inclined tooth part or simply a tooth. A direction of orientation is defined for the tooth part, said orientation being the same as that of the original tooth or of the imaginary, conventional tooth associated with a conventional gear wheel. This tooth orientation corresponds to the generatrices of the original imaginary, conventional tooth. The part of a member shown in FIG. 1, provided with a plurality of tooth parts, for example, the part $b, f, i, j, c, g, a, e$, retains essentially the functional capacity of a gear wheel. This also applies to bevel gear wheels, cylindrical gear wheels and hypoid wheels.

Figure 2:
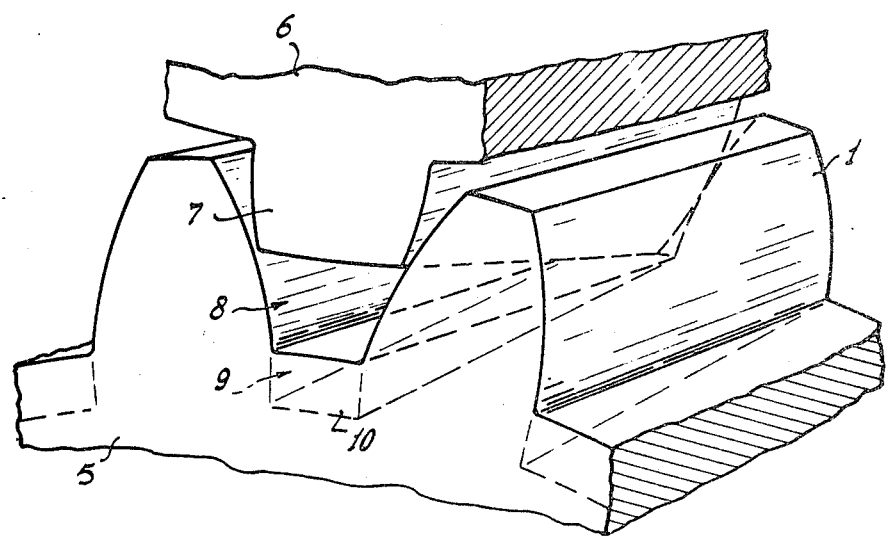
FIG. 2 is a perspective view of the area of contact between two members provided with tooth-shaped extensions.

FIG. 2 illustrates the contact area between a group of two members or gear wheels 5 and 6. Each member has in this case essentially the shape of a spur type gear wheel. The member 6 has a plurality of tooth parts 7, a portion of each tooth being omitted so that, for example, the part corresponding with the portion $b, f, i, j, c, g, a, e$ of FIG. 1 is left. In this embodiment of FIG. 2, member 5 has normal teeth. Between members 5 and 6, near the contact area, a space is available, which is mainly obtained by the absence of a portion of a conventional tooth, part of which is formed by tooth part 7 (compare the portion $b, f, h, d, i, j$ of FIG. 1). The tooth part 7 has a shape such that the space 8, defined by the outer surfaces of tooth part 7 and the root circle the surface between two gear teeth of gear wheel 5, has boundary faces diverging in a direction parallel to the tooth orientation or converging in the opposite direction.

Such a space may also be obtained by omitting a portion 9 (FIG. 2) of the gear wheel material located between two adjacent teeth feet, for example, the portion $e, g, o, p, q, r$ of FIG. 1. The gear wheel 6 may have conventional teeth or teeth of a different shape, for example, the shape shown in FIG. 2. The space thus formed between the gear wheels 5 and 6 also has boundary faces diverging parallel to the orientation of the tooth and converging respectively, that is to say the outer face of tooth part 7 and the face 10 located between the teeth feet of the gear wheel 5 (indicated by broken lines in FIG. 2), or the outer face of what would be the conventional tooth 7 and a face 10 indicated by broken lines in FIG. 2.

These alternatives equally apply to bevel gear wheels, cylindrical gear wheels and worm-and-worm gear wheel structures.

One feature of the boundary faces of the space 8 or 9 in the case of spur gear wheels is that at least part of the outer face of at least one tooth with a portion removed or the face located between at least two adjacent teeth or both are at least partly, at an angle to the rotary axis of the wheel. These faces may be flat, but they may alternatively form part, for example, of a conical surface, the apex of which may be located on the center line of the rotary shaft.

One feature of the boundary faces which define the space 8 or 9 of bevel gear wheels is that at least part of the outer face of at least one part-tooth or the face located between at least two adjacent part-teeth or both intersect the pitch cone of the normal gear wheel outside the apex. These faces may also be flat, but they may also form part of a conical surface which intersects the pitch cone of the normal spur gear wheel beyond its apex. Obviously, the outer faces and the faces located between the tooth feet may include, apart from said shapes, faces curved in a different manner.

Figure 9:
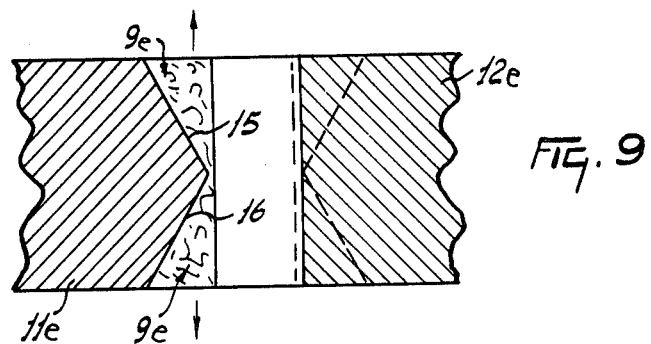
FIG. 9 is a sectional view similar to FIG. 4 but showing a sixth embodiment.

FIGS. 4 to 9 show sectional views of potential embodiments taken on the line A—A in FIG. 3; FIG. 4 is a sectional view of the spur wheels 11 and 12 (FIG. 3), the teeth of one wheel having a flat or a conical outer face 7A and the wheel 11 having normal teeth (see FIG. 2). FIG. 5 is a sectional view of the wheels 11 and 12, the teeth of the gear wheel 11a having the same shape as those of gear wheel 12, the chamfering being, in the opposite direction. The embodiment shown in FIG. 6 has gear wheels 11b and 12b having normal teeth, the material of the two wheels located between adjacent teeth being omitted in accordance with space 9 of FIG. 2 whereby a portion of the gear body disposed between the teeth and below the root circle has been removed. FIG. 7 shows the embodiment in which the teeth of the gear wheel 12 are chamfered, whereas with the gear wheel 11c, part of the gear wheel material located between the teeth and below the root circle is omitted (see FIG. 2). FIG. 8 shows that only part of gear wheel material located between adjacent teeth and below the root circle of the gear wheel is removed, whereas gear wheel 12d is a normal gear wheel. The face located between the teeth of wheel 11d is formed in this case by two faces 13 and 14 at an angle to each other, which are inclined in the same sense with respect to the associated rotary shaft of the gear wheel. The particular utility of this embodiment will be explained more fully hereinafter. FIG. 9 shows an embodiment in which the material below the root circle of two gear wheels 11e and 12e is removed from between the teeth. The boundary face formed in the same manner as described above is formed by two faces 15 and 16 at an angle to each other, which are inclined in opposite senses over the same angles with respect to the rotary shaft; with respect to the central plane at right angles to the rotary shaft the gear wheels 11e and 12e are mirror reflections. The prolongations of the faces 15 and 16 intersect the rotary shaft of the gear wheel on the same side of said central plane as that at which the face is located. The teeth, as such, are normal. All embodiments shown in FIGS. 4 to 9 have a space near the contact area between the gear wheels, said space having, viewed in the direction of the tooth (see the arrows of FIG. 9) diverging or converging boundary faces.

Figure 10:
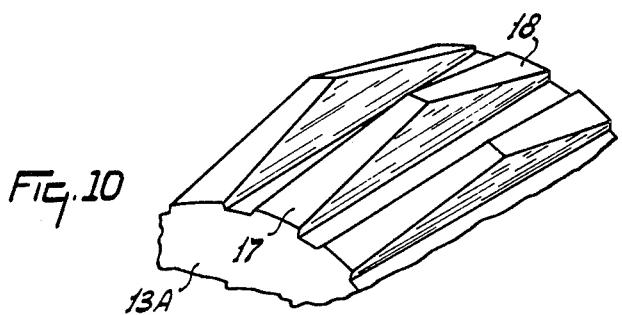
FIG. 10 is a perspective view of part of a member provided with symmetrical inclined tooth surfaces.

FIG. 10 shows perspectively part of a gear wheel 13A, in which the outer face of each tooth is formed by two faces 17 and 18 at an angle to each other, which are inclined to the same extent in opposite senses with respect to the intended axis of rotation. The gear wheel 13A is symmetrical to a central plane at right angles to such rotary axis of the wheel. The prolongations of faces 17 and 18 intersect the rotary axis on the same side of said central plane as the side at which face 17 and face 18 are located.

Figure 11:
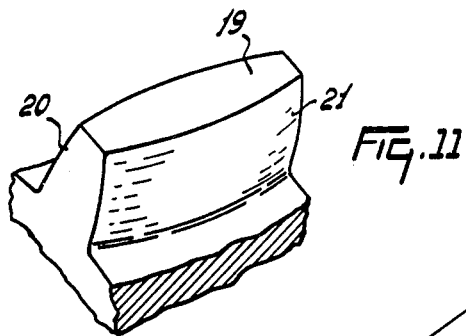
FIG. 11 is a perspective view of part of a member having a tooth with its sides curved in two directions.

Near the contact area between two members or gear wheels provided with tooth parts a space may be formed having boundary faces diverging or converging in the direction of the tooth by altering the shape of the flanks of the teeth in the gear wheel. As shown in FIG. 11 the tooth 19 has axially extending convex surfaces 20 and 21. Surfaces 20 and 21 are preferably parts of a spherical or conical surface, but as an alternative, they may be formed each by two flat faces diverging or converging in the direction of the tooth so that between two adjacent teeth a space is formed with boundary faces which are diverging or converging.

The preferred embodiment of the gear wheel shown in FIG. 12 comprises projecting teeth, which may be obtained on the basis of a spur gear wheel by providing both the tooth and gear material located below the root circle between two adjacent teeth with profiled cavities 22 and 23 respectively, said cavities being inclined in opposite senses with respect to a broken line indicated by arrow A parallel to the intended axis of rotation of the gear wheel. The boundary of cavity 22 is formed by two V-shaped flat faces 24 and 25 which intersect at 26 and are diverging in the direction of arrow A. The cavity located between the teeth approximately has the shape of a U. The surface 27 in the cavity 23 extends at an angle to the rotary axis for gear 28.

Figure 12:
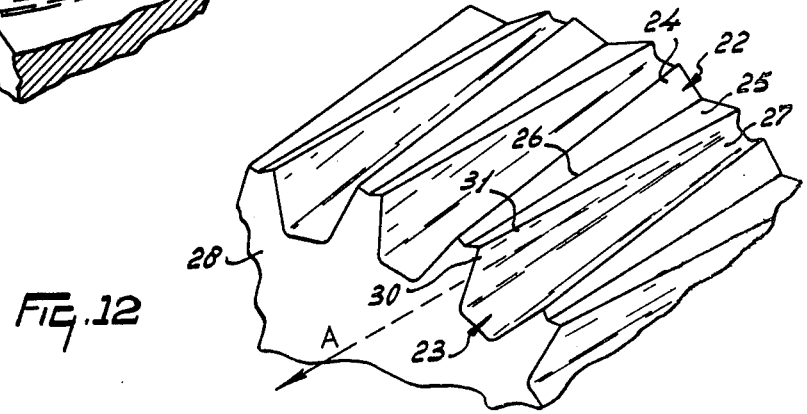
FIG. 12 is a perspective view of part of a preferred member embodying the invention.
Figure 13:
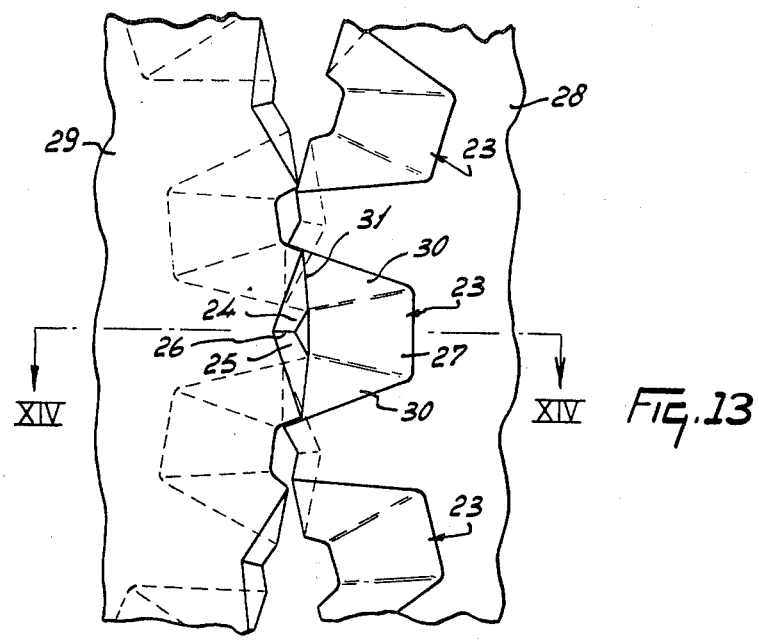
FIG. 13 is an elevation in a direction parallel to the rotary shafts of the contact area between two members having teeth as shown in FIG. 12.

As shown in FIG. 13 gear wheel 28 is in mesh with an identical gear wheel 29, which is arranged relatively to gear wheel 28 so that each tooth of one gear wheel having a cavity 22 extends at the contact area of the wheels, between two adjacent teeth of the other gear wheel in such manner that the contact areas of the two gear wheels are sufficiently large for transferring the tangential forces required for causing one wheel to drive the other. The sharp edges between face 24 and the adjacent tooth flank and between face 25 and the adjacent tooth flank 30 (FIG. 12), also in accordance with the nature of the material, being such that a cutting edge 31 is formed which has a cutting effect together with tooth flanks 30 bounding the cavity 23 of the other gear wheel during the movement on any crop located between the cutting edge 31 and tooth flank 30. In the arrangement of FIG. 13 one of the identical gear wheels is turned through 180° with respect to the other gear wheel. Near the contact area between the two gear wheels 28 and 29 a space is partly bounded by the teeth and is formed by the space formed by the cavity 22 of gear wheel 29 and by the space of the cavity 23 of gear wheel 28. Said space is bounded by boundary faces 24, 25, 27 diverging or converging in the direction of the time. The two time flanks 30 (FIG. 13) also form such faces.

The bevel gear wheel 32 shown in section in FIG. 16 and a broken portion thereof in FIG. 15 has teeth 33, the outer face 34 of each tooth forming part of an imaginary cone 35, which intersects the pitch cone 36 of the imaginary, conventional bevel wheel outside the apex of the pitch cone 36. In the embodiment shown in FIGS. 15 and 16 the apex of cone 35 defined by outer faces 34 is located at a greater distance from gear wheel 32 than that of pitch cone 36. The surface 37 located between teeth 33 is in this embodiment the same as that of a conventional gear wheel. Wheel 32 is in mesh with a conventional bevel gear wheel 38 (FIG. 16). The face 40 of the material located between the teeth 39 of gear wheel 38 and outer faces 34 of the teeth of wheel 32 define a space 41 near the contact area of the two members, boundary faces 34 and 40 of said space diverging in the direction away from the apex of the pitch cone 36. It should be noted that the flanks of teeth 39 bounding space 41 also form two boundary faces diverging in the same direction. The latter is, indeed, independent of modifications of the bevel wheels, but the intermediate space 41 is only formed in the absence of part of the conventional wheel. In a similar manner such a space is obtained by omitting part of the material located between two teeth and by constructing the teeth like conventional teeth. Combinations of these two structures are also possible.

In accordance with the invention the phenomenon of undercutting occurring in the manufacture of wheels having a small number of teeth is advantageous, inasmuch as the space between two adjacent teeth is larger, whereas the resultant weakening of the tooth is not important due to the comparatively small driving torque to be transferred in this case between the two gear wheels. The teeth of the gear wheel 42 (FIG. 17) have outer faces inclined on one side corresponding with those of wheel 12 of FIG. 4, whereas the teeth of the otherwise conventional gear wheel 43 exhibit undercutting.

Figure 18:
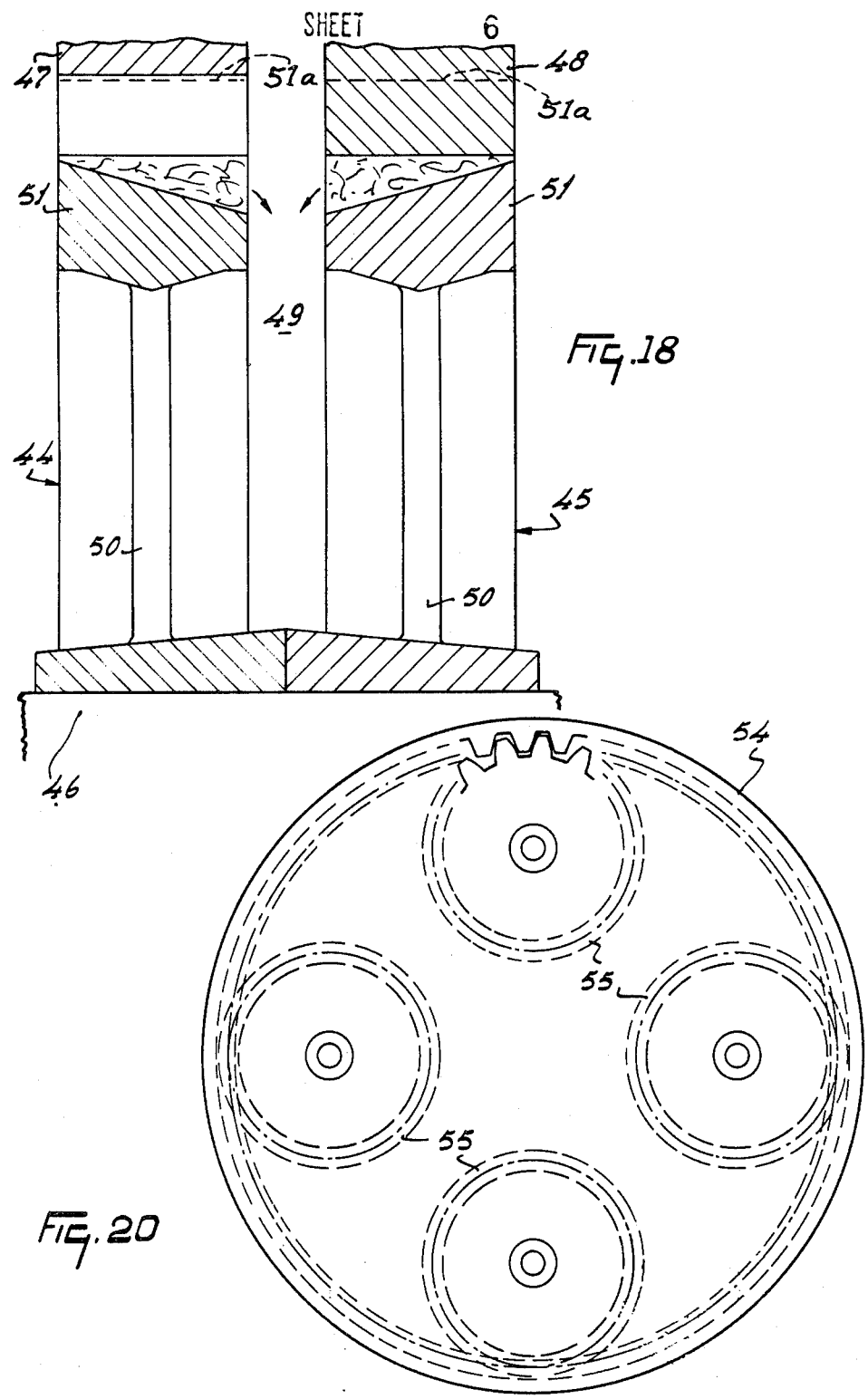
FIG. 18 is a sectional view of two adjacent pairs of toothed members.

The embodiment shown in FIG. 18 comprises two spur gear wheels 44 and 45, which are rotatably journalled by the same shaft 46. With the two wheels the material between the teeth is partly omitted as in the embodiment of gear wheel 11 in FIG. 6. Gear wheels 44 and 45 are each in mesh with conventional spur gear wheel 47 and 48 respectively, a lower portion only of each being shown in FIG. 18. The teeth of wheels 44 and 45 are relatively unaligned over half the wheels 44 and 45. The wheels comprise each a circumferential portion 51, held by spokes 50 and provided with the spur-gear type tine-shaped tooth 51a.

If desired, the circumferential portions 51 of gear wheels 44 and 45 may be integral, the space 49 being then formed by an at least substantially radial bore between the teeth 51a. In such event, gear wheels 47 and 48 may also be integral with each other, the lateral length of the teeth corresponding with the over-all lateral length of the teeth 51a of combined gear wheels 44 and 45. The teeth 51a are, in such case, in line with each other.

Figure 19:
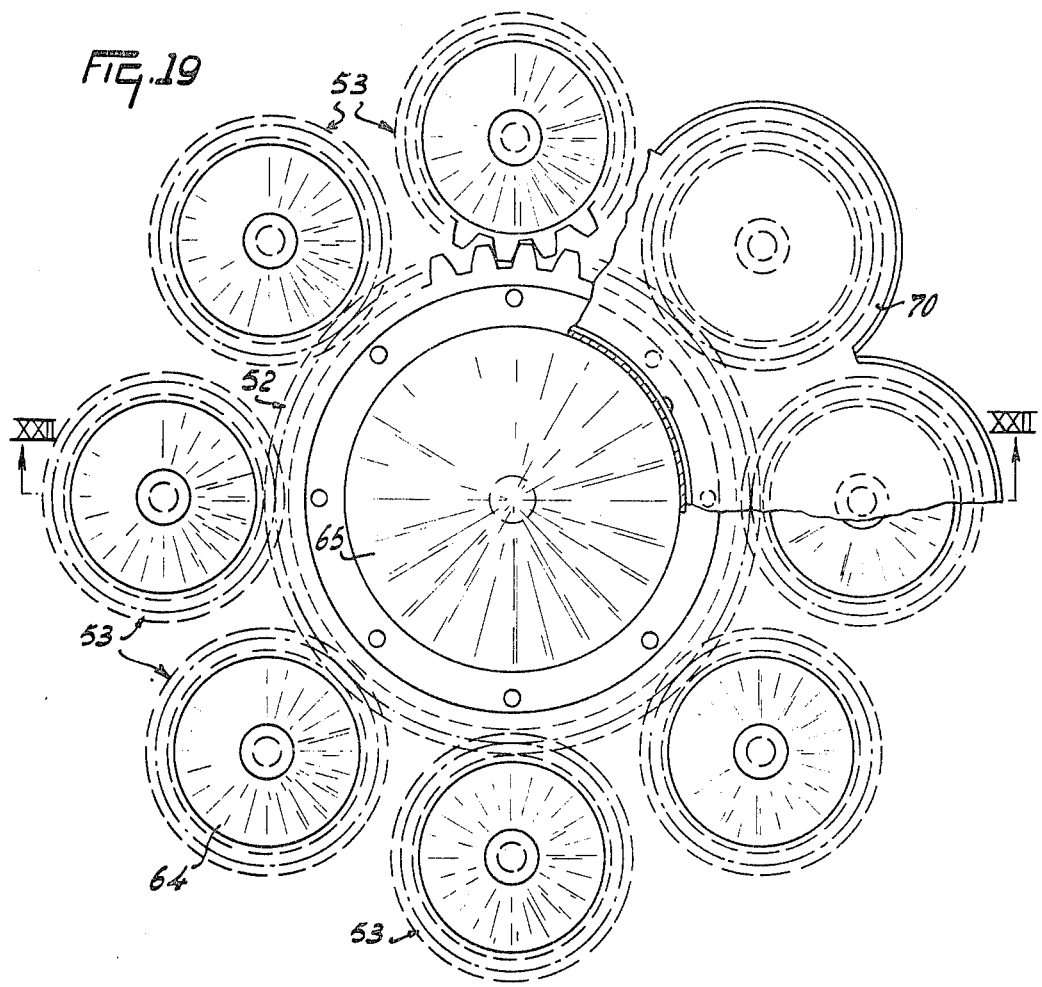
FIG. 19 is a plan view of a kind of sun wheel engaging a plurality of planet-wheel-like members.

The foregoing described forms of teeth and their relative orientation concern groups of two wheels. However, an appreciable portion of the circumference provided with teeth of each gear wheel is not employed to form spaces having diverging or converging boundary faces between two contacting members. This may be improved by causing a plurality of planet-wheel-shaped gear members 53 to engage a central sun wheel-like member 52 (FIG. 19). The teeth and the faces of the members located between teeth may be constructed in accordance with any one of the variants described above. The assembly shown in FIG. 19 has a comparatively large over-all size. The arrangement of FIG. 20 is a more compact assembly, in which a plurality of members provided with teeth and arranged such as planetary wheels 55 are in mesh with the inner side of a toothed-rim-like member 54. The members 55, in turn, may be in mesh with one or more wheels (not shown) in order to increase the number of spaces between the teeth at any moment.

The invention is not restricted to groups of members, each of which is provided with teeth. As an alternative, for example one rotatable-wheel-shaped member may be provided with teeth, a plurality of said teeth being constantly in contact with a flat or a curved face moving at the same rate as the ends of the teeth, for example, a wheel-shaped member having a cylindrical or conical circumferential surface.

Operation of the aforesaid devices will be understood with reference to FIGS. 3 and 4. The purpose of the invention is to provide an improved simple, efficacious device for compressing crop into compact lumps so that transport and storage of fodder in this form require minimum space. For this purpose the crop is fed in the direction of arrow 56 (FIG. 3) from a feeding space in between the wheel-shaped gear members 11 and 12 which are each provided with teeth rotating in the direction of the arrow B. Apart from the circumferential faces of gear wheels 11 and 12 two screening plates 57 and 58 (FIG. 4), extending substantially parallel to the two boundary faces of gear wheels 11 and 12 at right angles to the rotary axes thereof and intimately joining the latter faces determine the feeding space. However, at the area of the feeding, spaced plates 57 and 58 may be contoured to form a funnel in a direction at right angles to the plane of the drawing of FIG. 3, for example, for matching a feeding device of crop, arranged in the feeding space. At the contact area of the two members 11 and 12 at least one of the plates has an opening 59.

The crop is fed by a feeder to be described hereinafter if required by reason to provide a given pressure against the crop to force it into the feeding space and in between the teeth. The teeth of the two wheels engage the crop and urge it in the cases of FIGS. 3 and 4 into the spaces between two adjacent teeth of gear wheel 11 and tooth parts 7 of the teeth of gear wheel 12 penetrating into said spaces. The crop is thus compressed in space 8 formed by the partially absent portion of an imaginary, conventional tooth. If space 8 is not sufficiently filled, the crop contained therein will remain between the teeth involved for a further revolution, after which a new quantity of crop is added to the quantity already present in the contact area of the gear wheels until a given high pressure is attained in space 8. This pressure exerted by the wheels on the crop is denoted in FIG. 4 by P. The pressure P exerted on the crop by extension 7, bounded by the inclined outer face 13, has a component P1 at right angles to the inclined face 13 and a component P2 parallel to face 13. Component P2 is produced by the friction between the crop and face 13. If after one or more revolutions of wheel 11, new crop being added at each revolution in space 8, pressure P becomes so high that the component P2 exceeds the value corresponding to the maximum frictional coefficient between the crop and face 13, the compressed crop is shifted in the direction of arrow C of FIG. 4 and is urged out of space 8. In the meantime new crop is fed in so that after each revolution of gear wheels 11 and 12 the process is continued. Consequently, a strand of compressed coop continuously emerges from space 8, but this strand is broken up, for example, by its own weight, by vibrations or by a cutting member, the lumps falling, for example, through opening 59 of FIG. 4 in a collecting space or are conveyed farther or both. Crop moves out of space 8 in a direction substantially normal to the direction of pressure P. The outlet of the strand of crop and the compactness of the lumps are thus determined by the maximum friction coefficient between the crop and the material of the members.

It should be noted that the value of pressure P at which the crop emerges is, in accordance with the principle of the invention, higher than in the case in which pressure is exerted in the direction of emergence, the kind of crop, the kind of material of the wheels and the divergence in the direction of emergency being the same in both cases.

When a portion of material has been removed located between the teeth or in the case of combinations of the embodiments described (FIGS. 4 to 11, 13, 14, 16, 18) a similar phenomena occur. Also with the teeth flanks diverging or converging in the direction (FIGS. 11, 15, 16) the maximum friction coefficient in a direction of friction substantially at right angles to the direction of the pressure determines the pressure P exerted on the emerging crop. The fact that in the event of a small space between the two gear wheels a conventional bevel gear wheel is suitable for use in a device embodying the invention is a surprising effect of the use of this type of gear wheels.

The value of the maximum friction coefficient between the crop and the material of the wheels depends upon the nature of the material and of the surface thereof, on the extent of divergence or convergence and upon the nature of the crop.

Crop is most suitable to form lumps when the humidity content is about fifteen to twenty percent by weight. Hay dried partly in a natural way or with the aid of a drier is suitable for being fed into the device. During the compression some cohesion should be produced between the strangled stems of the crop. This cohesion may be acted upon by adding moisture or heating the gear wheels or both. The tangent of the angle between two diverging or converging boundary faces of the space thus defined is preferably about 0.1. The width of the teeth measured in the longitudinal direction of the tooth exceeds seven centimeters; preferably it is thirty centimeters. The speed of rotation of the gear wheels is preferably about 500 rev./min.

Figure 14:
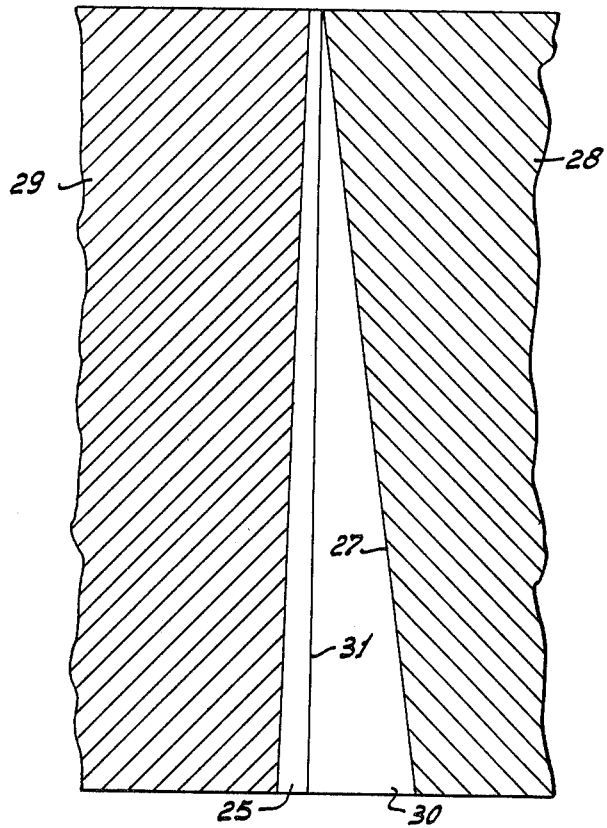
FIG. 14 is a sectional view taken on the line XIV—XIV in FIG. 13.

When a tooth of one gear wheel penetrates into a space between two teeth of the other gear wheel, a tight contact is established so that stems of crop projecting from space 8 or 9 are cut off and a severed strand is thrust out. The structure shown in FIGS. 12 to 14 is particularly suitable for this cutting operation. Edge 31 may form a cutting edge, particularly by hardening the material of the surface.

It should be noted that, if the section of the compression space at right angles to the direction of the gear teeth is wholly or partly circular, the over-all reactive force of the friction operating in the direction of the tine is at a minimum with a given compression space, a given extent of divergence, a given nature of the crop and of the wheel material, inasmuch as in this case the surface on which the reactive force of the required thrust is at a minimum at a given capacity of the compression space. An approximation thereof may be obtained when the teeth exhibit undercutting (FIG. 17). It should furthermore be noted that the forces resulting in pressure P form the main forces from a structural point of view, whereas from the same point of view the reactive forces due to component P2 (FIG. 4) and the driving torque of the wheels are secondary magnitudes. The reactive forces due to component P2 eliminate one another, when the chamfering of the removed portion located between two teeth (FIG. 9) or that of the upper surface of the teeth (FIG. 10) or both (FIG. 13) are symmetrical.

Prior to or during the insertion into feeding space 56 (FIG. 3) the crop is preferably cut to short pieces by a cutting member.

It is desirable to have a means of varying the extent of divergence or convergence for matching the nature of the crop. This may be achieved most simply by arranging the rotary shafts of the relatively engaging members so as to be relatively pivotable and fixable in a plurality of positions. The teeth then no longer fit accurately in the space between the teeth of the other gear wheel, so that protuberances may be formed on the compressed lump, but since the angular displacement is very small owing to the value of the nominal angle between the boundary faces, this side-effect can be accepted without any difficulty.

Figure 21:
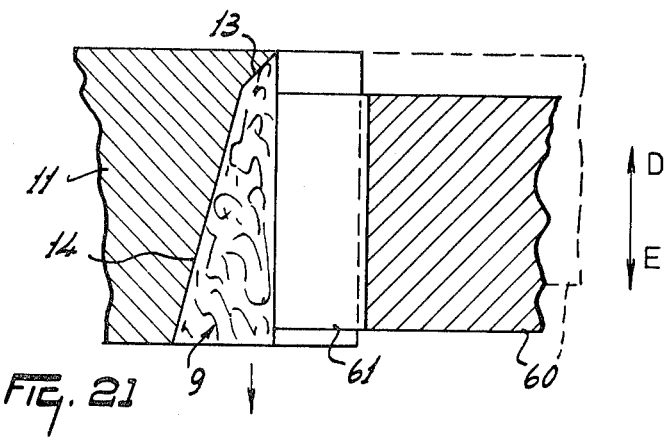
FIG. 21 is a sectional view similar to FIG. 4 but showing an embodiment in which the displaceability of the crop with respect to the members may be varied.

A further mode of acting upon the pressure at which the crop emerges may be carried out by means of the shape of the space created by the removed portion of the gear wheel between every pair of teeth shown in FIG. 8 (see also FIG. 21), said material being bounded by two faces 13 and 14 at an angle to each other. Gear wheel 11 is in mesh with a conventional gear wheel 60 having teeth 61. The width of wheel 60 is smaller than that of wheel 11, and with respect to wheel 11, wheel 60 is displaceable in the direction of the arrows D and E of FIG. 21. If, for example, very high pressures were built up in space 9 prior to the emergence of the crop therefrom gear wheel 60 is displaced in the direction of arrow D. The tooth 61 is then located partly opposite face 13 of wheel 11; this face is at a larger angle to the outer surface of tooth 61 than face 14 engaged under normal conditions. Crop between face 13 and tooth 61 tends to shift at comparatively low pressures along face 13 towards face 14 and to exert a usually pulsatory force on the crop engaging face 14 parallel to the plane of the drawing so that the maximum friction coefficient between the crop and face 14 will be exceeded and crop is thrust out at comparatively low pressures.

Figure 22:
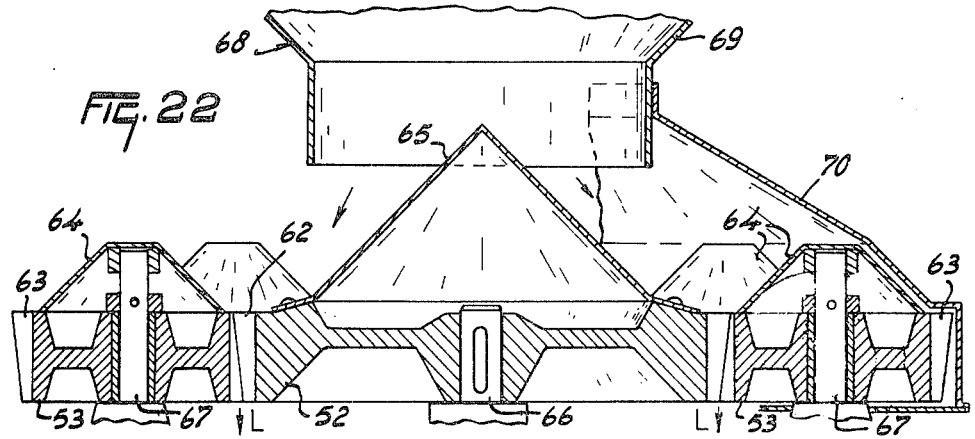
FIG. 22 is a sectional view of a device taken on the line XXII—XXII in FIG. 19.

FIG. 22 shows schematically an embodiment comprising the assembly of FIG. 19 of the sun wheel-like gear member 52 engaging eight planetary wheels 53. The outer faces of the teeth 62 of wheel 52 are located on an imaginary conical plane, the apex of which is located relative to FIG. 22 beneath wheel 52. The outer faces of teeth 63 of each of planet wheels 53 are also located on an imaginary conical plane, the apex of which is located relative to FIG. 22 beneath the wheel 53 concerned. The surface of the material located between the teeth of all wheels is that of a conventional gear wheel. Consequently, between the latter faces and the outer faces of the teeth of the cooperating wheel, spaces are defined having boundary faces which diverge in the direction of the arrows L. Each wheel 53 has a substantially conical guide face 64, which does not extend over the teeth. In a similar manner wheel 52 has a conical guide face 65. Wheels 52 and 53 are rotatably and drivingly journalled on parallel shafts 66 and 67 respectively. Over wheel 52 a supply channel 68 is arranged, which has at the top a partially funnel-shaped opening 69. The outer side of the assembly is intimately surrounded by an outer jacket 70.

Crop is fed, for example, by means of a worm (not shown) through funnel 69 into the space between cones 64 and 65 towards the rotating teeth, which insert crop near the contact areas between the wheels 53 and 52 into the compression space, the crop being thrust out in the direction of arrows L in the form of a strand. Crop sliding between jacket 70 and cone 64 towards the outer side of a wheel 53 is carried along by the teeth of said wheel towards the contact area between the wheels together with any crop already located between the teeth and having already passed the contact area or compression area, but not being available to a sufficient extent for attaining the exit pressure. Beneath the wheels 53, jacket 70 is also in intimate contact in order to prevent the crop from falling down or from winding around shaft 67. The compressed lumps are ejected and conducted away in the direction of arrows L.

Figure 23:
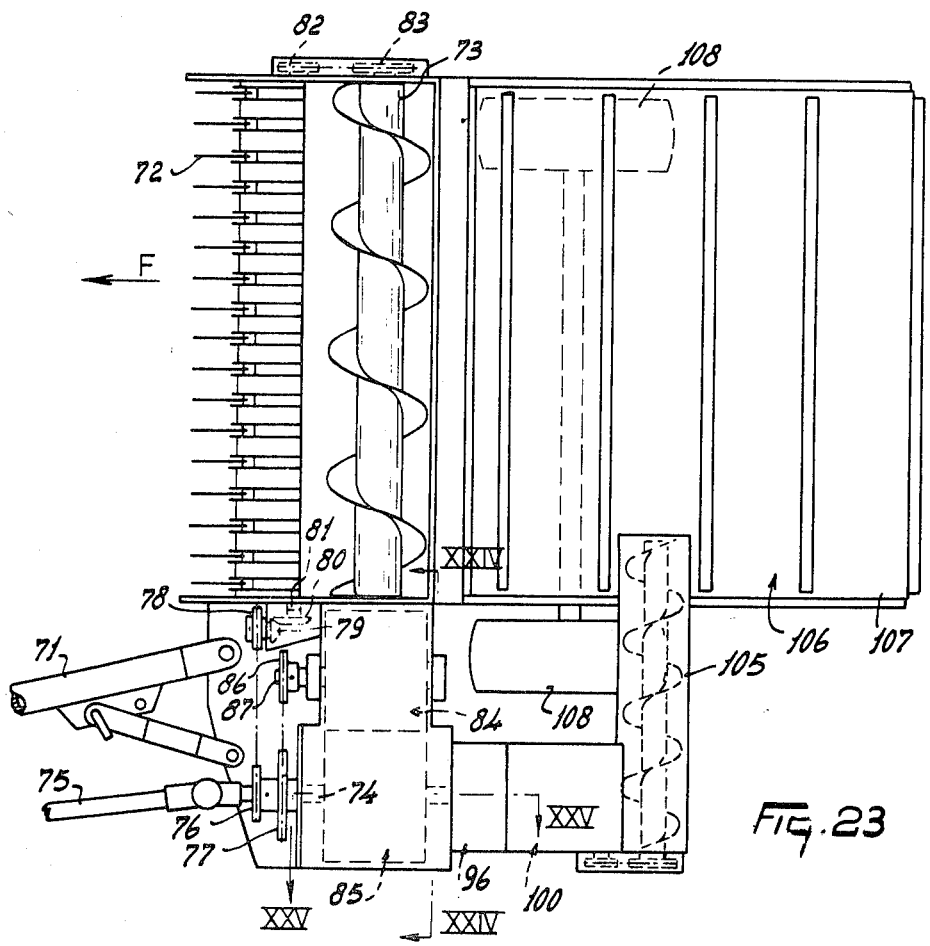
FIG. 23 is a plan view of a first embodiment of a movable device.
Figure 24:
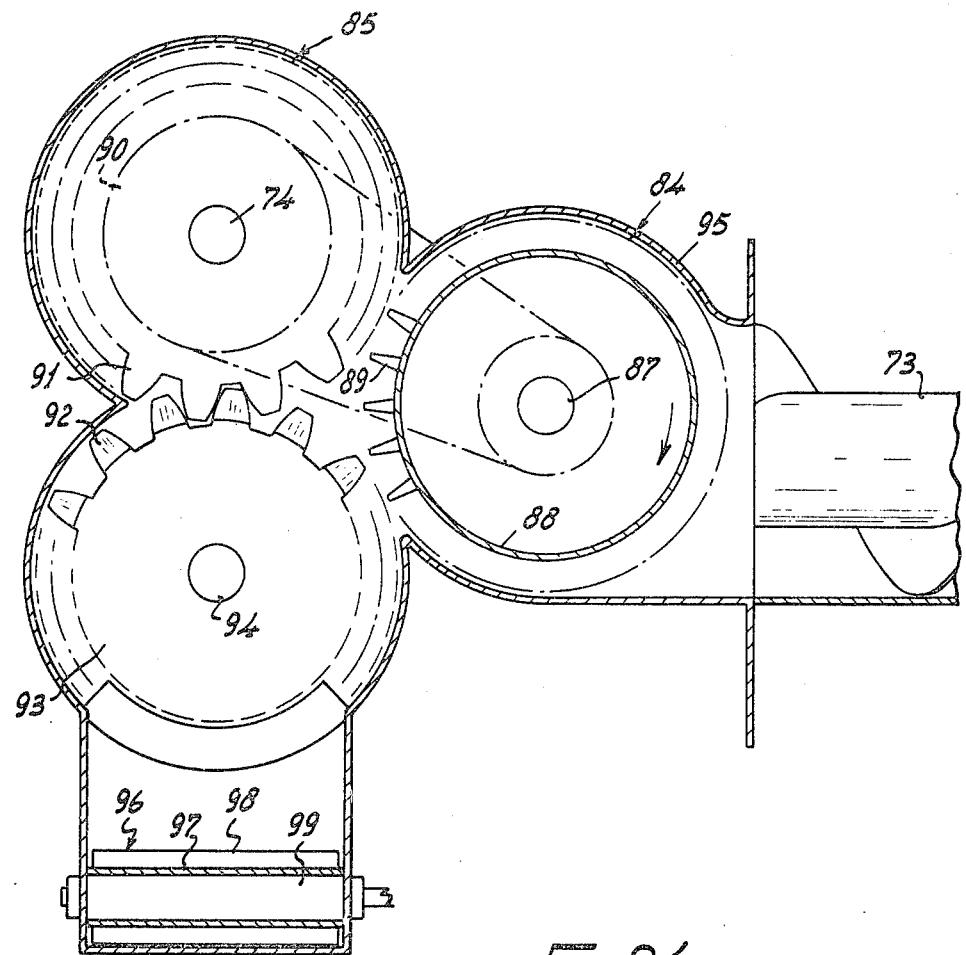
FIG. 24 is an enlarged sectional view taken on the line XXIV—XXIV in FIG. 23.

The movable device shown in FIG. 23 can be propelled by a tractor (not shown). The device is provided with a drawbar 71, which can be secured in a plurality of positions relative to the device. The arrangement comprises furthermore a pick-up device 72 for lifting the crop from the field; this pick-up is similar to the type used with loading wagons and the like; said pick-up projects laterally from one side of the tractor. Proximate the upper part of pick-up device 72 and behind the same, viewed in the direction of movement F, an auger 73 is arranged, the rotary shaft of which extends approximately transversely of direction of movement F. A shaft 74, extending approximately in direction of movement F and adapted to be driven via an auxiliary shaft 75 by the power take-off shaft of the tractor, is provided with two chain sprockets 76 and 77. Chain sprocket 76 is adapted to drive a further chain sprocket 78, located nearer the pick-up device. The rotation of said sprocket is transferred by means of two bevel gear wheels 79 and 80 to the driving shaft 81 of pick-up device 72. The end of shaft 81 remote from gear wheel 80 is provided with a chain sprocket 82, by which a chain sprocket 83 fastened to the rotary shaft of worm 73 is driven. In line with worm 73 are arranged a second feeder 84 and a group 85 of two compression members. Feeder 84 is driven with the aid of chain sprocket 77 and a chain sprockets 86 cooperating with the former and fastened to a rotary shaft 87 of feeder 84. Feeder 84 (FIG. 24) comprises a rotatable drum 88 provided at the surface with a plurality of rows of teeth 89 radially extending outwardly and preferably formed by triangular sheets. The group 85 located at the side of the feeder 84 comprises a conventional spur gear wheel 90 having teeth 91 (see FIGS. 24 and 25), journalled on the substantially horizontal shaft 74, extending in direction of movement F. Gear wheel 90 cooperates with a gear wheel-like member 93 provided with teeth 92 and journalled on a rotary shaft 94, extending parallel to shaft 74. Shaft 94 is located approximately vertically under shaft 74. Gear wheel-like member 93 corresponds with member 13A of FIG. 10, referred to above. The diameter of the members 90 and 93 is about 30 centimeters; also the width measured in direction of movement F is 30 centimeters. A steel-sheet casing 95 intimately surrounds the tooth surfaces of the members 84 and 85 (FIG. 24). Casing 95 is arranged at a given distance from the outer surfaces of such members.

Figure 25:
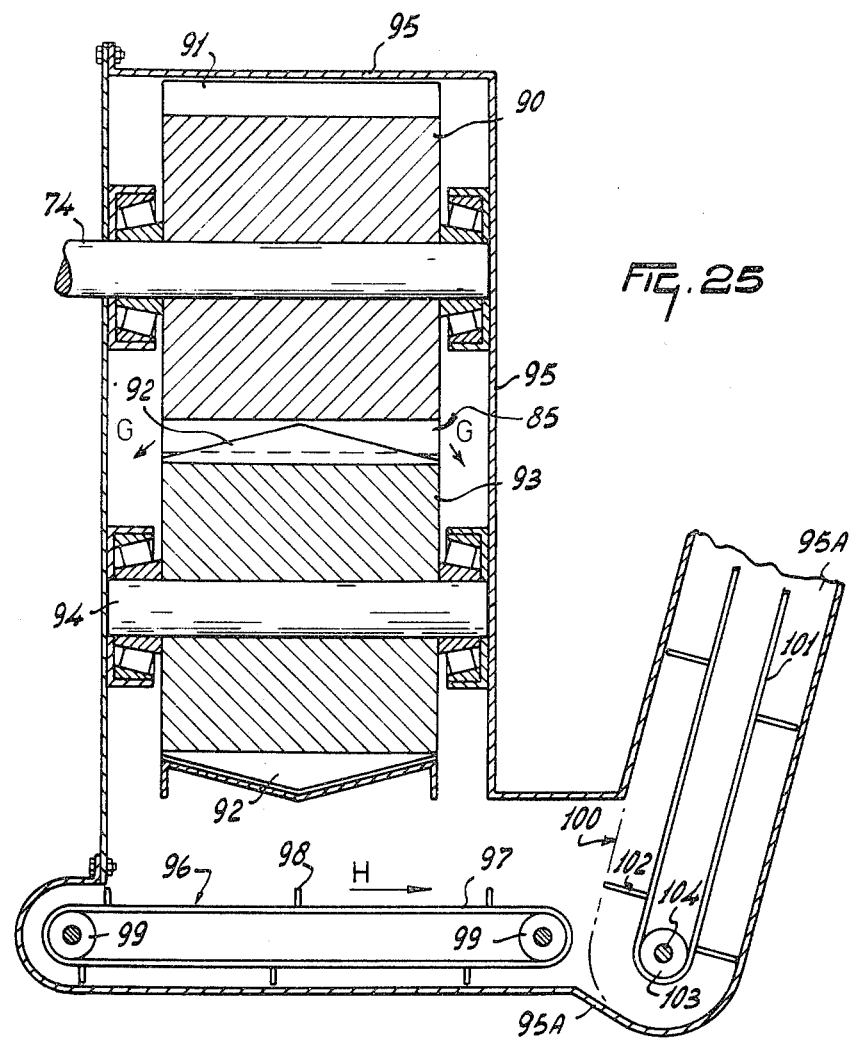
FIG. 25 is an enlarged sectional view taken on the line XXV—XXV in FIG. 23.

As seen in FIGS. 24 and 25, under the group 85, a horizontal conveyor 96 is disposed; it is formed by an endless belt 97 provided with partitions 98. Belt 97 travels around two rollers, each of which is rotatable about shafts extending transversely of direction of movement F. Conveyor 96 projects rearwardly beyond the group 85. At the rear, conveyor 96 is joined by a second, upwardly extending conveying member 100, which is also formed by an endless belt 101 provided with flexible partitions 102 (for example, rubber flaps). The free ends of partitions 102 are intimately surrounded by a casing 95A which surrounds conveying member 100. Belt 101 also travels around rollers 103 which are adapted to rotate about shafts 104, extending transversely of direction of movement F. Conveying member 100 opens out at the top above a third conveyor formed by a horizontal worm conveyor 105, which extends transversely of direction of movement F (FIG. 23). One end of worm conveyor 105 is located above a storage trough 106. The bottom of trough 106 comprises a conveyor formed by a folling floor 107. Rolling floor 107 is adapted to travel around two horizontal shafts (not shown), extending transversely of the direction of movement F.

The device is movable by means of two wheels 108 and is supported at the front from the tractor propelling the device.

The group 85 is driven directly by auxiliary shaft 75 preferably at the rate of about 500 rev./min. Feeder 84 is driven preferably at the rate of about 1000 rev./min. Pick-up device 72 and worm conveyor 73 rotate with speeds corresponding approximately with the speed of like members in a baler.

When the device is moved by the tractor with the aid of drawbar 71 in direction F across a field with partially dried crop, the crop is lifted from the field by tines of pick-up device 72 and fed rearwardly to worm conveyor 73. This worm conveyor urges the crop towards the feeder 84 with drum 88 being rotated via auxiliary shaft 75 and chain sprockets 77 and 86 in the direction indicated by the arrow in FIG. 24. Teeth 89 disentangle, in a matter of speaking, the crop supplied and ensure a uniform supply of crop to members 90 and 93. Teeth 91 of wheel 90 and teeth 92 of the member 93 grip the crop and urge it into the space between the teeth of wheel 90 and the outer faces of teeth 92 of the member 93. As stated above, after one or more revolutions of the member required to insert a sufficient quantity of crop into the spaces, a high pressure is produced in each such space, the crop being thus compressed into a coherent strand. This pressure may vary between 250 kgs./ccm and 400 kgs./ccm. Owing to the shape of surfaces of the outer faces of the teeth 92 a strand of crop is thrust on either side out of the group of members by the pressure produced in the direction of the arrows G (FIG. 25), in the space between members 85 and casing 95. These strands are broken up, for example, by their contact with casing 95. The lumps then fall on conveyor 96, which moves in the direction of the arrow H. The lumps drop down at the rear of conveyor 96 and are collected by the flexible partitions 102 of conveyor 100, which intimately joins casing 95A and partitions 98 of belt 97. Conveyor 100 shifts the lumps upwardly. At the top of conveyor 100 the lumps drop on worm conveyor 105. The direction of rotation of worm conveyor 105 is such that the lumps are conveyed to above the rolling floor 107 of trough 106, where they are collected. After trough 106 is filled, it may be emptied by actuating the rolling floor 107.

Figure 26:
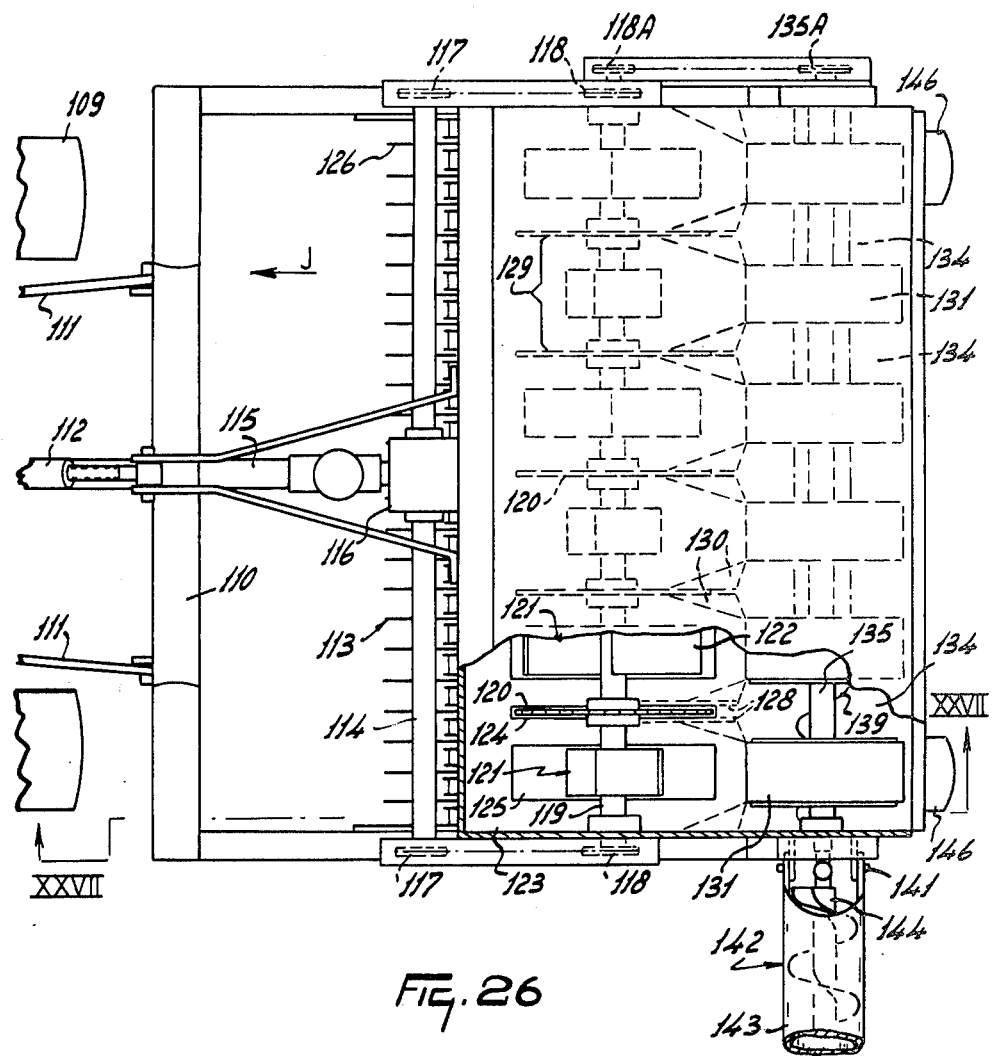
FIG. 26 is a plan view of a second embodiment of a movable device.

FIGS. 26 and 27 show a further movable device for compressing crop, which is coupled in line with the rear end of a tractor 109 propelling the device. For this purpose it can be attached by the frame 110 to the three-point lifting device 111, 112 of tractor 109. Frame 110 is provided with a pick-up device 113 constructed in the form of the pick-up of a loading truck or a baler. Above pick-up device 113, on plan and viewed in the direction of movement J, near the front of pick-up device 113, a driving shaft 114 extends transversely of the direction of movement; by means of an auxiliary shaft 115 and a right-angle transmission arranged in a housing 116 said shaft is rotated. The ends of shaft 114 are provided with chain sprockets 117, which are adapted to drive chain sprockets 118 by means of chains. Chain sprockets 118 are fastened to a shaft 119, extending transversely of the direction of movement. Shaft 119 is located above and, as seen in plan, at a short distance behind shaft 113A, driving pick-up device 113. Shaft 119 is provided with alternating cutting members 120 and pushing members 121. Cutting members 120 are each formed by a substantially circular plate serrated at its periphery. The shape of this cutting member corresponds with that of a circular saw. On either side of each cutting member a pushing member 121 is formed mainly by two curved plates 122, fastened to shaft 119. Each plate 122 has a rectangular shape in an exploded view. With respect to the direction of rotation K each curved plate 122 occupies a dragging position. Viewed from a side, an imaginary plane connecting the outer edges of the plates 112 which are remote from shaft 119 and parallel to said shaft, intersects approximately the center line of shaft 119. Pushing members 121 are fastened to shaft 119 in a manner such that the aforesaid imaginary plane connecting the outer edges of curved plates 112 of one of the pushing members is at right angles to a similar imaginary plane of an adjacent pushing member. Instead of using pushing members 121 described above, the feeding members known from the construction of loading wagons may also be employed. Shaft 119 is provided with five cutting members 120 and six pushing members 121 so that six adjacent groups 129 are formed (FIG. 26). Cutting members 120 and pushing members 121 project through rectangular openings 124 and 125 respectively in a guide plate 123. Such plate 123 together with the top side 126 of pick-up device 113 forms a crop feeding channel 127, which narrows to the rear. The portion of feeding channel 127 located behind shaft 119, viewed from above, is bounded on the bottom and top sides by approximately parallel walls. If required, an additional cutting member may be arranged on either side of each pushing member 121 said cutting member being formed by a stationary knife shown schematically in FIG. 27 and provided with an upwardly inclined cutting edge.

Cutting members 120 form the planes of separation between two adjacent groups 129. These planes of separation are prolonged behind members 120 in the form of approximately vertical partitions 130, arranged inside feeding channel 127 and shown schematically in FIG. 26. Away from the plane of each member 120 partitions 130 diverge to the rear. Behind and in between partitions 130 of one group, viewed in the direction of movement J, a group of compression members 131 is provided. The group 131 comprises two members 132 and 133, located above one another and provided with tine-shaped extensions. Each pair of members 132, 133 is associated with one group 129 (FIG. 26). Consequently, this embodiment comprises six adjacent groups of compression members 131. Between two adjacent groups of compression members 131 a space 134 is left behind the rear side of each pair of downwardly diverging partitions 130.

The topmost compression members 132 are arranged on one horizontal shaft 135, extending transversely of the direction of movement J, whereas the lowermost compression members 133 are arranged on a shaft 136, extending parallel to shaft 135. Shaft 135 is driven by means of a chain sprocket 135A at one end, which is linked by a chain to a chain sprocket 118A located at the side of wheel 118. The outer surfaces of teeth projecting from members 132 and 133 are intimately surrounded by a casing 137. Members 132 and 133 are identical to the gear-wheel-like members described with reference to FIGS. 12 to 14.

Beneath members 132 and 133 an auger conveyor 139 is arranged in a trough 138. Said auger conveyor is adapted to rotate about a shaft 140, extending parallel to shafts 135 and 136 and extends over the whole width of the device. At one end of conveyor 139 a discharging device 142 is arranged so as to be tiltable about a shaft 141, extending approximately in the direction of movement J; said discharging device comprises a hollow channel 143 and a second auger conveyor 144, arranged therein and drivingly coupled with the conveyor 139.

The arrangement is supported from two ground wheels 146 arranged on extension arms 145 fastened to frame 110. In operation the device extends directly behind the tractor 109 and may be lifted by the tractor for transport purposes.

In operation the crop lying on the ground is lifted by pick-up device 113 in known manner and shifted over the whole width onto the top side 126 of the pick-up device. Pushing members 121, rotating in the direction of the arrow K, push crop into channel 127. The crop is severed at the plane of separation between the groups 129 by cutting members 120 and distributed among the six groups, and during the movements produced by pushing members 121 crop is again cut by knives 128. The crop is subsequently urged through the slightly ascending hindmost portion of channel 127 towards compression members 132, 133 and gripped by the teeth of said members.

Crop is subsequently pressed into the spaces formed by the cavities of teeth 22 and the cavities 23 between such teeth (FIGS. 12 to 14). The cutting edges 31 sever the crop emerging from the cavities 22 and 23, when contacting the teeth so that a nearly cut strand is obtained. The strands are urged on either side out of the members into space 134 (FIG. 26). Due to their own weight the strands are broken up and the lumps drop into trough 138. They are then conducted away by worm conveyors 139 and 144.

During road transport channel 143 is tilted upwardly around pivotal shaft 141. The device shown in FIGS. 26 and 27 is a compression device of high capacity and high rate of operation, with the crop directly fed to the compression members.

Recapitulating it may be stated that the compression members embodying the invention are capable of compressing crop at a high pressure so that at a given pressure determined mainly by the shape of the compression space the compression members are self-releasing without the need for special precautions to remove the crop from the space and without the need for using very expensive compression members. Conventional gear wheels are used, which are adapted in a simple manner.

It is a further advantage that the compressed crop in the form of strands has a uniform, homogeneous composition inasmuch as the crop cannot leave the compression space as long as holes are still found in the crop to be compressed. Only when the compression space is completely filled, can the required pressure be attained for pushing the crop out. Moreover, a simple adaption to the nature of the crop can be carried out.

The invention is not restricted to what is mentioned in the specification or in the claims or both, but also includes the details of the figures, whether described or not.

Having thus described the invention, what we claim as new and desire to secure by Letters Patent of the United States is:

1. A device for compressing crop which comprises:
   a first member comprising a gear wheel which is adapted to rotate about an axis of rotation and has at least two side by side teeth extending therefrom;
   a second member comprising a further gear wheel which is adapted to rotate about a second axis of rotation and has at least one further tooth adapted to be moved by rotation of said gear wheels relatively between said first mentioned side by side teeth;
   means defining a space for compressing crop which comprise adjacent sides of said first mentioned teeth, the surface of said gear wheel between said first mentioned teeth and the addendum surface of said further tooth received in said space; at least two of said space defining means converging relative to each other whereby when said further tooth moves between said first mentioned teeth with crop in said space said crop is compressed between said converging space defining means with a portion of the compressive forces urging crop so compressed in a direction which is in opposition to the converging direction of said space defining means, the addendum surface of said further tooth received in said space being inclined relative to said second axis of rotation whereby in a plane containing said said second axis of rotation and passing through said addendum surface the line in said plane where it intersects said surface is inclined relative to said second axis of rotation.

2. A device in accordance with claim 1 including rotary shafts wherein each said member is adapted to rotate about one of said rotary shafts.

3. A device in accordance with claim 1, wherein said further tooth has a portion of its addendum configuration omitted to form the converging relationship between said surfaces.

4. A device in accordance with claim 1, wherein said members have wheel-shaped configurations which are substantially coplanar and each of said members has a plurality of said teeth extending from their respective peripheries.

5. A device in accordance with claim 4, wherein said teeth have a substantially uniform cross-section across the peripheries of said members in planes perpendicular to the axes of rotation of said members.

6. A device in accordance with claim 4, wherein said upper surfaces of said teeth of said second member are inclined downwardly from substantially the middle of the periphery of said second member as seen from above.

7. A device in accordance with claim 4, wherein said upper surfaces of said teeth of said second member diverge from one side of such member's periphery to the other as seen from above whereby said upper surfaces each appear as a truncated isosceles triangle as seen from above.

8. A device in accordance with claim 7, wherein said upper surfaces are trough-shaped as seen from the side, the edges of said surfaces across said periphery being provided with a cutting edge for shearing crop parts received between said members for compressing.

9. A device in accordance with claim 1, wherein at least one of said members has the configuration of a bevel wheel.

10. A device in accordance with claim 1, wherein at least one of said teeth includes an outer face comprising one of said space defining means, said outer face comprising two face parts disposed at an angle to each other with the line of intersection of said face parts being normal to the direction of rotation of said teeth.

11. A device in accordance with claim 1, wherein at least one of said teeth includes an outer face comprising one of said space defining means, said outer face having a pair of longer opposite edges and having a depressed area relative to said longer opposite edges.

12. A device in accordance with claim 11, wherein said depressed area viewed at right angles is V-shaped.

13. A device in accordance with claim 1, wherein there is a substantially U-shaped cavity in said first member between said side by side teeth as viewed from the side of said first member.

14. A device in accordance with claim 1, wherein at least one of said side by side teeth includes a knife-like cutting edge.

15. A device in accordance with claim 1, wherein said first and second members are surrounded by a casing which cooperates with said members for collecting crop compressed thereby.

16. A device in accordance with claim 1, wherein crop feeding means is provided adjacent said members to feed crop into said space.

17. A device in accordance with claim 16, wherein said crop feeding means comprises a drum and crop supplying means on said drum.

18. A device in accordance with claim 16, wherein said crop feed means comprises a worm conveyor which is substantially perpendicular to a plane containing the axes of rotation of said members.

19. A device in accordance with claim 1, wherein said members are mounted on substantially parallel shafts, and are adapted to be rotated around the longitudinal axes of said shafts, said direction that said crop is urged when it is compressed between said converging surfaces being substantially parallel to said axes.

20. A device in accordance with claim 19, wherein crop feeding means is provided which is adapted to feed crop into said space in a direction substantially perpendicular to a plane which contains said axes.

21. A device in accordance with claim 20, wherein a feeding channel is included in said crop feeding means which provides a passage for crop to move to said space.

22. A device in accordance with claim 19, wherein means is provided for adjusting within limits the relative angular disposition of said shafts relative to each other whereby the angle of convergence of said converging surfaces is adjustable within limits.

23. A device in accordance with claim 1, wherein means is provided for adjusting within limits the angle of convergence of said converging space defining means.

24. A device in accordance with claim 1, wherein said second member has a cylindrical configuration and a plurality of said teeth spaced around said second member, the addendum surfaces of said second member's teeth being inclined relative to the axis of rotation of said second member.

25. A device in accordance with claim 24, wherein said surfaces are flat.

26. A device in accordance with claim 24, wherein said surfaces are coplanar within a conical plane.

27. A device in accordance with claim 1, wherein said members are circular with an outer surface which is bevelled, said members being disposed with their axes of rotation at an angle relative to each other and including a plurality of said teeth extending from their respective peripheries.

28. A device for compressing crop which comprises:
a first member having first mounting means comprising a rotary shaft for rotating it about a first axis, said first member having a plurality of outwardly extending teeth spaced around it;
a second member having second mounting means comprising a further rotary shaft for rotating it about a second axis, said second member having a plurality of inwardly extending grooves spaced around it, said second member disposed relative to said first member whereby a portion of said teeth are received in a portion of said grooves for compressing crop received therein, the outer faces of said teeth diverging relative to the inner faces of said grooves when received therein whereby crop compressed between said faces is subjected to lateral forces acting in the direction of said divergence and substantially parallel to said axes;
said first mounting means being angularly movable relative to said second mounting means, angular displacement means associated with at least one of said rotary shafts being provided for selectively pivoting and fixing the angle between said rotary shafts whereby the angle of said divergence may be selectively changed, and
crop supplying means proximate said first and second member for supplying crop to where said teeth are received in said grooves.

29. A device in accordance with claim 28, wherein said mounting means comprise rotary shafts.

30. A device in accordance with claim 28, including displacement means for selectively moving and securing the relative position of said mounting means without changing the angular relationship between said axes.

31. A device in accordance with claim 30, wherein said displacement means includes means for moving said first mounting means along said first axis relative to said second mounting means.

32. A device in accordance with claim 31, wherein there are at least two angles of divergence between said inner and outer faces.

33. A device in accordance with claim 27, wherein the outer faces of the teeth of said members are located in a conical plane having its apex in the axis of rotation of said one member and the surfaces between the teeth of said one member are located in a further conical plane having its apex in the axis of rotation of said one member at a point closer to said one member than the apex of said first mentioned conical surface.

* * * * *